(12) United States Patent
Kitagawa et al.

(10) Patent No.: US 10,968,855 B2
(45) Date of Patent: Apr. 6, 2021

(54) CONTROL SUPPORT DEVICE, VEHICLE, CONTROL SUPPORT METHOD, RECORDING MEDIUM, LEARNED MODEL FOR CAUSING COMPUTER TO FUNCTION, AND METHOD OF GENERATING LEARNED MODEL

(71) Applicant: TOYOTA JIDOSHA KABUSHIKI KAISHA, Aichi-ken (JP)

(72) Inventors: Eiki Kitagawa, Odawara (JP); Daiki Yokoyama, Gotemba (JP); Keisuke Nagasaka, Gotemba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/658,160

(22) Filed: Oct. 21, 2019

(65) Prior Publication Data
US 2020/0132011 A1 Apr. 30, 2020

(30) Foreign Application Priority Data
Oct. 25, 2018 (JP) .............................. JP2018-201218

(51) Int. Cl.
*F02D 41/24* (2006.01)
*G06N 3/08* (2006.01)
*B60W 10/06* (2006.01)

(52) U.S. Cl.
CPC ......... *F02D 41/2474* (2013.01); *B60W 10/06* (2013.01); *F02D 41/2441* (2013.01); *F02D 41/2461* (2013.01); *G06N 3/08* (2013.01)

(58) Field of Classification Search
CPC ............. F02D 41/2474; F02D 41/2461; F02D 41/2441; F02D 41/24; G06N 3/08; G06N 3/084; G06N 20/10; G06N 5/003; G06N 7/005; B60W 10/06
USPC ......... 123/672, 674, 703, 704; 701/103–105, 701/109, 110; 73/114.71, 114.72, 114.73
See application file for complete search history.

(56) References Cited

U.S. PATENT DOCUMENTS

| | | | |
|---|---|---|---|
| 2003/0050742 A1 | 3/2003 | Sakamoto et al. | |
| 2020/0017117 A1* | 1/2020 | Milton | ................. B60W 50/02 |
| 2020/0248641 A1* | 8/2020 | Nakamura | .......... F02D 41/1405 |

FOREIGN PATENT DOCUMENTS

| | | |
|---|---|---|
| JP | 2003-50605 A | 2/2003 |
| JP | 2012-112277 A | 6/2012 |
| JP | 2017-215898 A | 12/2017 |

* cited by examiner

*Primary Examiner* — Hai H Huynh
(74) *Attorney, Agent, or Firm* — Hauptman Ham, LLP

(57) ABSTRACT

A control support device for supporting control of a vehicle using a learned model obtained by machine learning, includes: a data acquisition unit acquiring sensor information, which is related to a state of an inside or an outside of a supplying vehicle that supplies parameters to be used for the machine learning; a learning unit generating a learned model by performing the machine learning using an input/output data set, which is the sensor information acquired by the data acquisition unit and is data including input parameters and an output parameter of the learned model; and a transmission unit Transmitting at least one of the generated learned model and an output parameter calculated by inputting sensor information of the vehicle, control of which is supported, to the generated learned model as an input parameter.

19 Claims, 9 Drawing Sheets

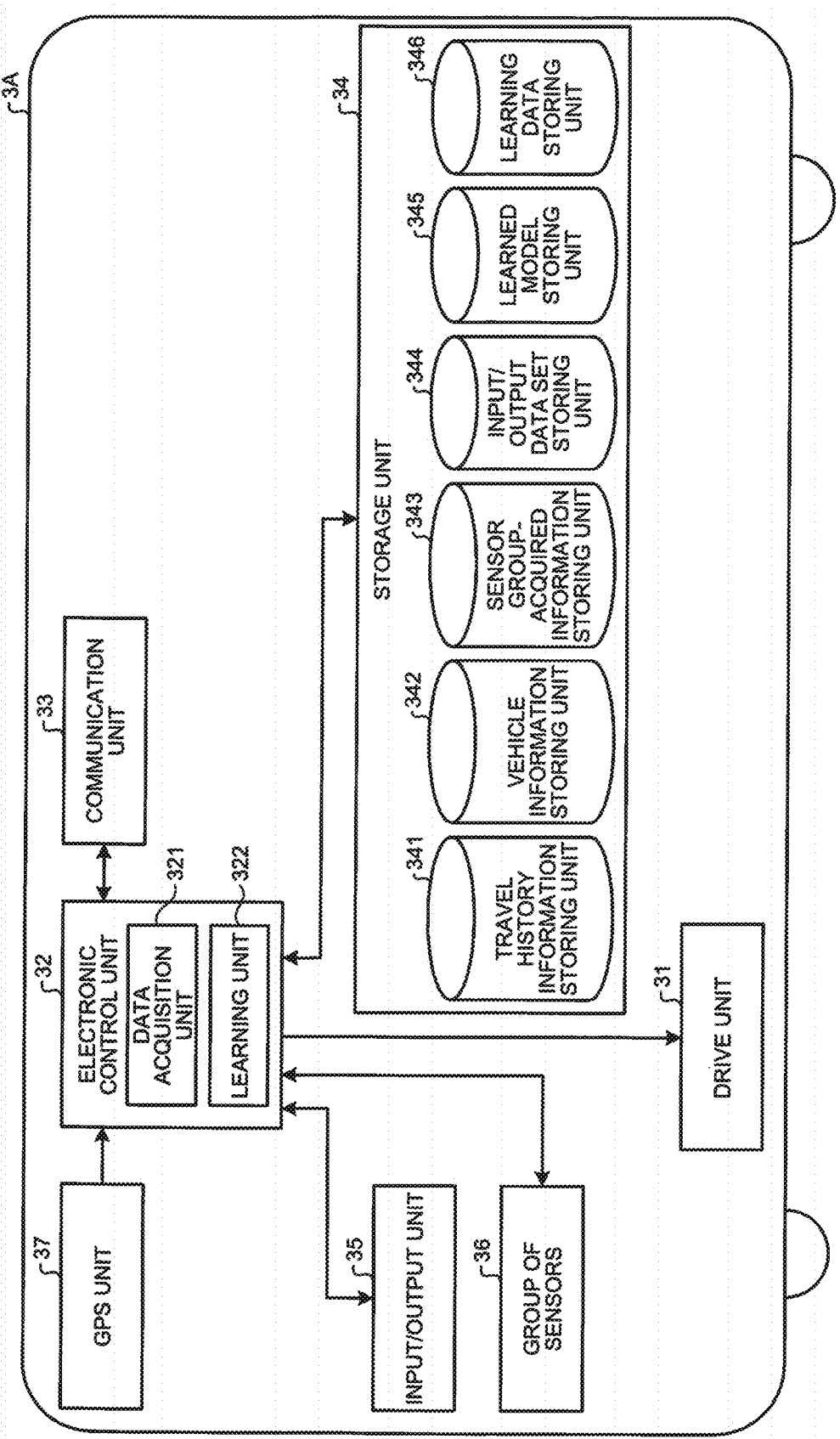

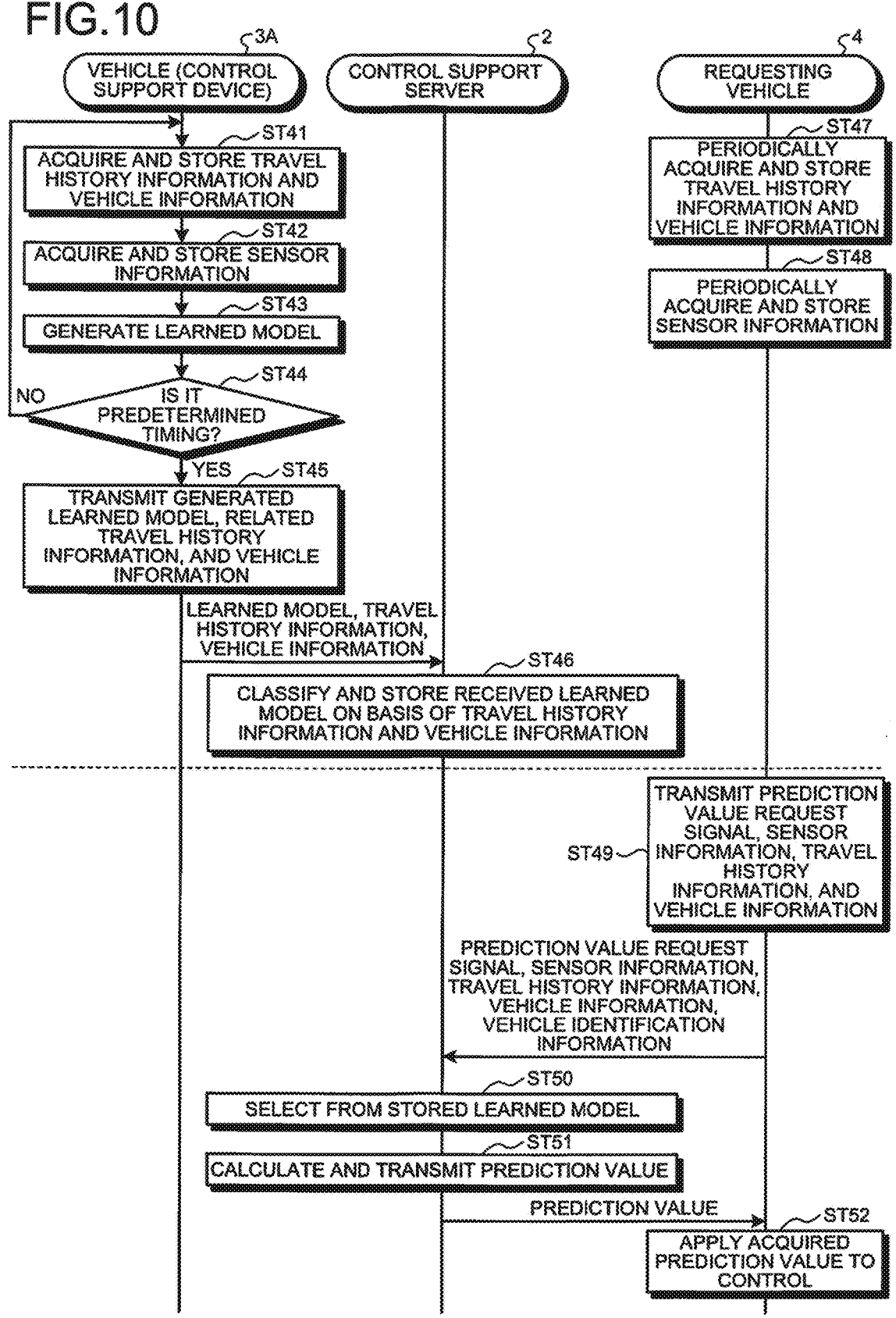

CONTROL SUPPORT DEVICE, VEHICLE, CONTROL SUPPORT METHOD, RECORDING MEDIUM, LEARNED MODEL FOR CAUSING COMPUTER TO FUNCTION, AND METHOD OF GENERATING LEARNED MODEL

CROSS-REFERENCE TO RELATED APPLICATION(S)

The present application claims priority to and incorporates by reference the entire contents of Japanese Patent Application No. 2018-201218 filed in Japan on Oct. 25, 2018.

BACKGROUND

The present disclosure relates to a control support device, a vehicle, a control support method, a recording medium, a learned model for causing a computer to function, and a method of generating a learned model.

There is known a technique of controlling an internal combustion engine using a learned model by machine learning based on a neural network (see, for example, Japanese Laid-open Patent Publication No. 2012-112277). In this technique, a learned model is used to estimate the flow rate of gas in a predetermined passage of the internal combustion engine to control the internal combustion engine on the basis of the estimation result.

SUMMARY

There is a need for providing a control support device, a vehicle, a control support method, a recording medium, a learned model for causing a computer to function, and a method of generating the learned model for providing support to enable control substantially equivalent to control using a learned model by machine learning even in a vehicle not mounted with a machine learning device.

According to an embodiment, a control support device for supporting control of a vehicle using a learned model obtained by machine learning, includes a data acquisition unit acquiring sensor information, which is related to a state of an inside or an outside of a supplying vehicle that supplies parameters to be used for the machine learning; a learning unit generating a learned model by performing the machine learning using an input/output data set, which is the sensor information acquired by the data acquisition unit and is data including input parameters and an output parameter of the learned model; and a transmission unit transmitting at least one of the generated learned model and an output parameter calculated by inputting sensor information of the vehicle, control of which is supported, to the generated learned model as an input parameter.

According to an embodiment, a control support device for supporting control of a vehicle using a learned model obtained by machine learning, includes: a data acquisition unit acquiring sensor information, which is related to a state of an inside or an outside of a supplying vehicle that supplies a parameter used for the machine learning; a learning unit generating a plurality of learned models by performing the machine learning using an input/output data set, which is the sensor information acquired by the data acquisition unit from a plurality of the supplying vehicles and is data including input parameters and an output parameter of the learned model; a selection unit selecting a learned model to be transmitted to the vehicle, control of which is supported, from among the plurality of learned models; and a transmission unit transmitting the selected learned model to the vehicle.

According to an embodiment, a control support device for supporting control of a vehicle using a learned model obtained by machine learning, includes: a data acquisition unit acquiring sensor information, which is related to a state of an inside or an outside of a supplying vehicle that supplies parameters to be used for the machine learning; a learning unit generating a plurality of learned models by performing the machine learning using an input/output data set, which is the sensor information acquired by the data acquisition unit from a plurality of the supplying vehicles and is data including input parameters and an output parameter of the learned model; a selection unit selecting a learned model from among the plurality of learned models; a prediction unit calculating an output parameter, which is obtained by inputting sensor information of the vehicle, control of which is supported, to the selected learned model as input parameters; and a transmission unit transmitting the calculated output parameter to the vehicle.

According to an embodiment, a control support device communicating with a server storing a learned model obtained by machine learning, the control support device supporting control of a vehicle using the learned model, includes: a data acquisition unit acquiring sensor information, which is related to a state of an inside or an outside of a supplying vehicle, the data acquisition unit being mounted on the supplying vehicle that obtains parameters to be used for the machine learning; a learning unit generating a learned model by performing the machine learning using an input/output data set, which is the sensor information acquired by the data acquisition unit and is data including input parameters and an output parameter of the learned model; and a transmission unit transmitting the generated learned model to the server.

According to an embodiment, a vehicle includes a vehicle control device communicating with a server which stores a learned model obtained by machine learning, the server including: a server storage unit storing the learned model, which is generated by the machine learning, which is performed by using sensor information, which is related to a state of an inside or an outside of a supplying vehicle that supplies parameters to be used for the machine learning as an input/output data set, which is data including input parameters and an output parameter of the learned model; and a server communication unit transmitting at least one of the generated learned model and an output parameter, which is calculated by input of sensor information of the vehicle as an input parameter to the learned model in a case where the sensor information of the vehicle is received, the vehicle control device including: a data acquisition unit acquiring sensor information, which is related to a state of an inside or an outside of the vehicle; and a communication unit transmitting a model request signal requesting transmission of the learned model or a parameter request signal requesting transmission of an output parameter calculated on a basis of the sensor information acquired by the data acquisition unit and the sensor information to the server and receive the generated learned model or the calculated output parameter in response to the model request signal or the parameter request signal, respectively.

A vehicle according to an embodiment of the present disclosure includes a vehicle control device communicating with a server which stores a learned model obtained by machine learning, the server including: a server learning unit generating a learned model by performing the machine learning using an input/output data set, which is sensor information related to a state of an inside or an outside of a vehicle and is data including input parameters and an output parameter of the learned model, the vehicle control device including: a data acquisition unit acquiring sensor information, which is related to a state of an inside or an outside of the vehicle; and a transmission unit transmitting the sensor information acquired by the data acquisition unit to the server.

According to an embodiment, a vehicle includes a vehicle control device communicating with a server which stores a learned model obtained by machine learning, the vehicle control device including: a data acquisition unit acquiring sensor information, which is related to a state of an inside or an outside of the vehicle; a learning unit generating a learned model by performing the machine learning using an input/output data set, which is the sensor information acquired by the data acquisition unit and is data including input parameters and an output parameter of the learned model; and a transmission unit transmitting the learned model generated by the learning unit to the server.

According to an embodiment, a control support method executed by a control support device which supports control of a vehicle using a learned model obtained by machine learning, includes: a data acquisition step of acquiring sensor information, which is related to a state of an inside or an outside of a supplying vehicle that supplies parameters to be used for the machine learning; a learning step of reading an input/output data set, which is the sensor information acquired in the data acquisition step and is data including an input parameter and an output parameter of the learned model, from a storage unit and generating a learned model by performing the machine learning using the read input/output data set; and a transmission step of transmitting at least one of the generated learned model and an output parameter obtained by inputting sensor information of the vehicle, control of which is supported, to the learned model as an input parameter.

According to an embodiment, a non-transitory computer readable recording medium stores a control support program for causing a control support device, which supports control of a vehicle using a learned model obtained by machine learning, to execute: a data acquisition step of acquiring sensor information, which is related to a state of an inside or an outside of a supplying vehicle that supplies parameters to be used for the machine learning; a learning step of reading an input/output data set, which is the sensor information acquired in the data acquisition step and is data including an input parameter and an output parameter of the learned model, from a storage unit and generating a learned model by performing the machine learning using the read input/output data set; and a transmission step of transmitting at least one of the generated learned model and an output parameter obtained by inputting sensor information of the vehicle, control of which is supported, to the learned model as an input parameter.

According to an embodiment, a learned model includes a neural network including: an input layer receiving input of input parameters that quantify a state of an inside or an outside of a vehicle; an intermediate layer receiving input of signals output from the input layer, the intermediate layer having a multilayer structure; and an output layer receiving input of signals output from the intermediate layer and outputting an output parameter that quantifies a predetermined state of the vehicle, each of the layers including one or more nodes, the learned model being associated with travel history information of the vehicle, and the learned model causing a computer to input the input parameters to the input layer, perform calculation based on a network parameter of the neural network which is a learned network parameter, and output a value that quantifies the predetermined state of the vehicle from the output layer.

According to an embodiment, a method of generating a learned model, causes a computer to output a value that quantifies a predetermined state of a vehicle, in which the computer uses a neural network, which includes an input layer, which receives input of input parameters that quantify a state of an inside or an outside of the vehicle, an intermediate layer, which receives input of signals output from the input layer, the intermediate layer having a multilayer structure, and an output layer, which receives input of signals output from the intermediate layer, and outputs an output parameter, each of the layers including one or more nodes, to perform leaning while updating a network parameter of the neural network on a basis of an output parameter output by the output layer on a basis of input of the input parameters and an output parameter, which forms an input/output data set together with the input parameter, and storing the network parameter in a storage unit in association with travel history information of the vehicle.

BRIEF DESCRIPTION OF THE DRAWINGS

FIG. 9 is a block diagram schematically illustrating a configuration of a supplying vehicle according to a third embodiment; and FIG. 10 is a flowchart illustrating the flow of processing of a control support method according to the third embodiment.

DETAILED DESCRIPTION OF THE PREFERRED EMBODIMENTS

In the related art, machine learning based on a neural network requires a sufficient amount of data and computing power. In particular, when a learned model by machine learning is applied to control of a vehicle, the number of parameters increases, and the amount of calculation also becomes enormous. Since machine learning devices that perform learning using a large number of parameters and an enormous amount of calculation are very costly, the number of vehicles on which a machine learning device can be mounted are limited. In this case, a performance difference occurs between a vehicle mounted with a machine learning device and a vehicle not mounted with a machine learning device. Therefore, it is desired to develop a technology capable of reducing the performance difference between a vehicle mounted with a machine learning device and a vehicle not mounted with the machine learning device and executing similar control to that of the case of using a learned model by machine learning, even in the vehicle not mounted with the machine learning device.

Hereinafter, embodiments of the present disclosure will be described with reference to the drawings. Note that, in all the following drawings of the embodiments, the same symbols are assigned to the same or corresponding components. The present disclosure is not limited by the embodiments described below.

First Embodiment

Figure 1:
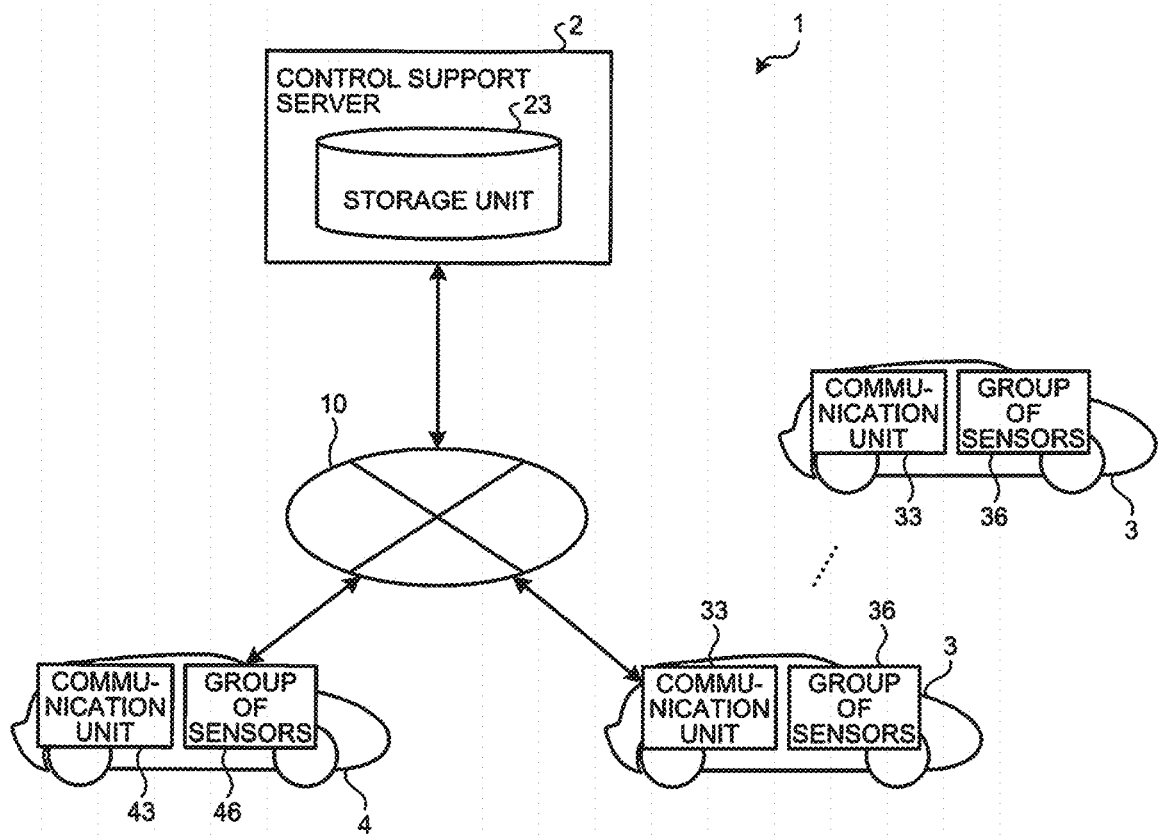
FIG. 1 is a schematic diagram illustrating a control support system to which a control support device according to a first embodiment of the present disclosure can be applied.

First, a control support system according to a first embodiment will be described. FIG. 1 is a diagram illustrating a control support system according to this first embodiment. As illustrated in FIG. 1, a control support system 1 includes a control support server 2 including a storage unit 23, a plurality of vehicles 3 each including a communication unit 33 and a group of sensors 36, and a vehicle 4 including a communication unit 43 and a group of sensors 36. The control support server 2, the plurality of vehicles 3, and the vehicle 4 are capable of communicating with each other via a network 10.

The network 10 includes the Internet network, a mobile phone network or the like. The network 10 is, for example, a public communication network such as the Internet, and includes, for example, a combination of one or more of a local area network (LAN), a wide area network (WAN), a telephone communication network such as a mobile phone, a public line, a virtual private network (VPN), and an exclusive line. In the network 10, wired communication and wireless communication are appropriately combined.

Control Support Server

Figure 2:
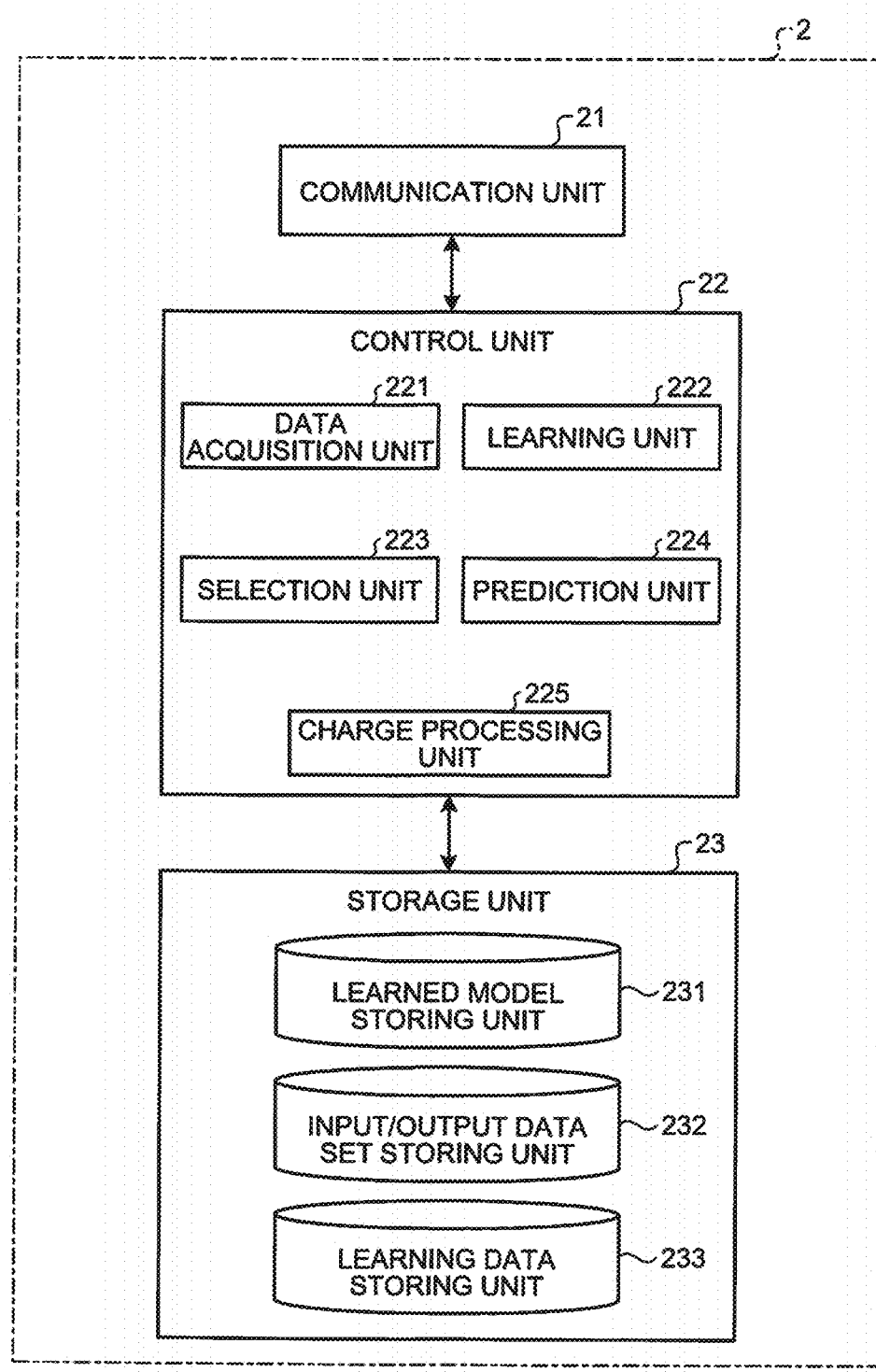
FIG. 2 is a block diagram schematically illustrating a configuration of the control support device according to the first embodiment of the present disclosure illustrated in FIG. 1.

The control support server 2 executes data collection processing of collecting various types of information transmitted from the plurality of vehicles 3 each including a communication unit 33 as a transmission unit via the network 10. The control support server 2 is capable of executing machine learning on the basis of the collected various types of information. The control support server 2 transmits, to the vehicle 4, a predetermined learned model for controlling each component of the vehicle 4. FIG. 2 is a block diagram schematically illustrating a configuration of the control support server 2.

As illustrated in FIG. 2, the control support server 2 includes a communication unit 21, a control unit 22, and the storage unit 23. The communication unit 21 may be, for example, a local area network (LAN) interface board or a wireless communication circuit for wireless communication. The LAN interface board or the wireless communication circuit is connected to the network 10 such as the Internet which is a public communication network. The communication unit 21 as a transmission unit and a reception unit is connected to the network 10 to perform communication with the plurality of vehicles 3 and a predetermined vehicle 4. The communication unit 21 as a server communication unit receives vehicle identification information, travel history information, or vehicle information unique to the vehicles 3 and 4 from the vehicles 3 and 4 or transmits learned models or control signals to the vehicles 3 and 4.

The vehicle identification information includes various types of information for identifying the individual vehicles 3 and 4. The travel history information includes information such as travel time ranges, travel routes, traveling regions, congestion information, weather, the outside air temperature, and outside air humidity of each of the vehicles 3 and 4. The information of the travel time range may be information of whether it is morning, noon, or night, information of whether it is a commuting time range, information of whether the sun is up or the like. The travel route information may be information as to whether a specific road is inbound or outbound, information as to whether a specific road is inbound or outbound added with information of a travel time range or the like. The information of traveling regions may be information of traveling lines, information of municipalities, information of prefectures, or information of areas such as Kanto and Tokai areas. The congestion information may be information in which the actual congestion information and a travel time range are associated with each other, information in which the actual congestion information and congestion causes acquired by the vehicle Information and communication system (VICS) (registered trademark) are associated with each other or the like. The information of the weather may be information in which the wind direction, the wind speed, and the traveling direction are associated with each other, information of changes in the road surface condition due to rain or snow or the like. The outside air temperature or humidity includes not only the temperature or humidity at the time of travelling but also information of the actual measured temperature or measured humidity of the outside air. The vehicle information includes information of the vehicles 3 and 4, and especially includes as information of the internal combustion engine, the state, the input, and the output of the engine. The vehicle information may further include information such as a total travel distance, positional information, speed information, acceleration information, loading information, sensor group-acquired information, and a vehicle type.

Specifically, the control unit 22 incudes a processor such as a central processing unit (CPU), a digital signal processor (DSP), and a field-programmable gate array (FPGA) and a main storage unit such as a random access memory (RAM) or a read only memory (ROM) (neither is illustrated).

The storage unit 23 includes a storage medium selected from a volatile memory such as a RAM, a nonvolatile memory such as a ROM, an erasable programmable ROM (EPROM), a hard disk drive (HDD), and a removable media. Note that a removable medium is, for example, a universal serial bus (USB) memory or a disc recording medium such as a compact disc (CD), a digital versatile disc (DVD), or a Blu-ray (BD) (registered trademark) disc. Alternatively, the storage unit 23 may be configured using a computer readable recording medium such as a memory card that can be externally mounted. The storage unit 23 is capable of storing an operating system (OS), various programs, various tables, various databases and the like for executing the operation of the control support server 2. The various programs also include a control support program according to the first embodiment. These various programs can also be distributed widely by being recorded in a computer readable recording medium such as a hard disk, a flash memory, a CD-ROM, a DVD-ROM, and a flexible disk.

The control unit 22 implements a function meeting a predetermined purpose by loading a program stored in the storage unit 23 into a work area of the main storage unit executing the program, and controlling respective components through the execution of the program. In the first embodiment, the functions of a data acquisition unit 221, a learning unit 222, a selection unit 223, a prediction unit 224, and a charge processing unit 225 are executed by execution of the programs by the control unit 22.

The data acquisition unit 221 acquires, as various types of sensor information related to the internal or external state of the vehicle 3 acquired by the group of sensors 36 of the vehicle 3, an input parameter, which is a predetermined control signal, and an output parameter obtained as a result of control corresponding to the input parameter. The data acquisition unit 221 writes and stores the combination of the input parameter and the output parameter in an input/output data set storing unit 232 of the storage unit 23 as an input/output data set. Note that an input/output data set is also referred to as training data. The data acquisition unit 221 further writes and stores the input parameters of the various types of sensor information acquired by the group of sensors 36 of the vehicle 3 in a learning data storing unit 233 of the storage unit 23 as input parameters of learning data.

The learning unit 222, which is also a server learning unit, performs machine learning on the basis of the input/output data set acquired by the data acquisition unit 221. The learning unit 222 writes and stores the learning result in a learned model storing unit 231 of the storage unit 23. The learning unit 222 stores, at a predetermined timing, the latest learned model as of the predetermined timing in the learned model storing unit 231 of the storage unit 23, separately from the neural network performing the learning. Storing in the learned model storing unit 231 may be performed by an update in which an old learned model is deleted and the latest learned model is stored, or accumulation in which the latest learned model is stored while saving a part or all of an old learned model is kept stored.

The selection unit 223 which is also a server selection unit selects a predetermined learned model from among a plurality of learned models stored in the learned model storing unit 231. For example, the selection unit 223 selects the predetermined learned model on the basis of the travel history information transmitted from the vehicle 4 and travel history information associated with a learned model stored in the learned model storing unit 231. In the case where the selection unit 223 selects a learned model on the basis of travel history information, a learned model associated with travel history information having the highest degree of coincidence with the travel history information transmitted from the vehicle 4 may be selected.

The prediction unit 224, which is also a server prediction unit, calculates an output parameter obtained by quantifying the physical quantity necessary to control the vehicle 4 by inputting the input parameters acquired by the data acquisition unit 221 to the predetermined learned model. The learned model used when the prediction unit 224 quantifies the physical quantity will be described later.

The charge processing unit 225 performs a series of processing of calculating and outputting, for example, a reward provided depending on the transmission amount of sensor information or a reward fixedly provided regardless of the transmission amount to a user of the supplying vehicle 3 in accordance with a predetermined contract. Note that a reward is not limited to money, and may be points usable for a predetermined use, a discount coupon or the like. Note that a reward may be further calculated depending on the transmission amount of vehicle information and travel history information. The output reward information is transmitted to a conventionally and publicly known server of a financial institution such as a credit card company or a bank, a server of a point card company (none is illustrated) or the like and is provided to the user of the vehicle 3 by a predetermined method. This allows the user of the supplying vehicle 3 to receive a reward for the transmission of the sensor information, the travel history information, or the vehicle information transmitted from the vehicle 3. Therefore, the discomfort of transmitting information can be reduced for the user of the vehicle 3, and the control support server 2 can collect more information. Furthermore, the charge processing unit 225 performs a series of processing of calculating and outputting, for example, a flexible consideration corresponding to the reception amount of learned models or the data amount of prediction values, which will be described later, that are received by the vehicle 4 or a fixed consideration independent of the reception amount or the data amount for the user of the requesting vehicle 4 in accordance with a predetermined contract. The output consideration information is transmitted to a conventionally and publicly known server of a financial institution such as a credit card company or a bank (none is illustrated) or the like and is claimed to the user of the vehicle 4 by a predetermined method. This allows the user of the requesting vehicle 4 to use a learned model in the vehicle 4 by paying a consideration, and thus use of learned models can be secured even in a case where a machine learning device is not mounted on the vehicle 4. Furthermore, the administrator of the control support server 2 can secure a reward to be paid to the user of the vehicle 3. The above points contribute to a spread of the control support system 1.

The storage unit 23, which is also the server storage unit, includes the learned model storing unit 231, the input/output data set storing unit 232, and the learning data storing unit 233. The learned model storing unit 231 stores learned models in a retrievable manner. The learned model storing unit 231 stores by accumulating or updating learned models generated by the learning unit 222 of the control unit 22. Note that the learned model storing unit 231 initially stores a learned model in the initial state. A learned model is generated on the basis of deep learning using a neural network. To store a learned model means to store information such as network parameters and operation algorithms in the learned model. A learned model is stored in association with the travel history information transmitted from the vehicle 3. That is, travel history information associated with an input/output data set transmitted from a predetermined vehicle 3 and a learned model generated from the input/output data set are associated with each other and stored in the learned model storing unit 231. Note that the learned model may be further associated with the vehicle information of the vehicle 3.

The input/output data set storing unit 232 stores an input/output data set including a set of the input parameters and the output parameter described above. The learning data storing unit 233 stores the output parameter calculated on the basis of the input parameters by the learning unit 222 as learning data together with the input parameters.

Figure 3:
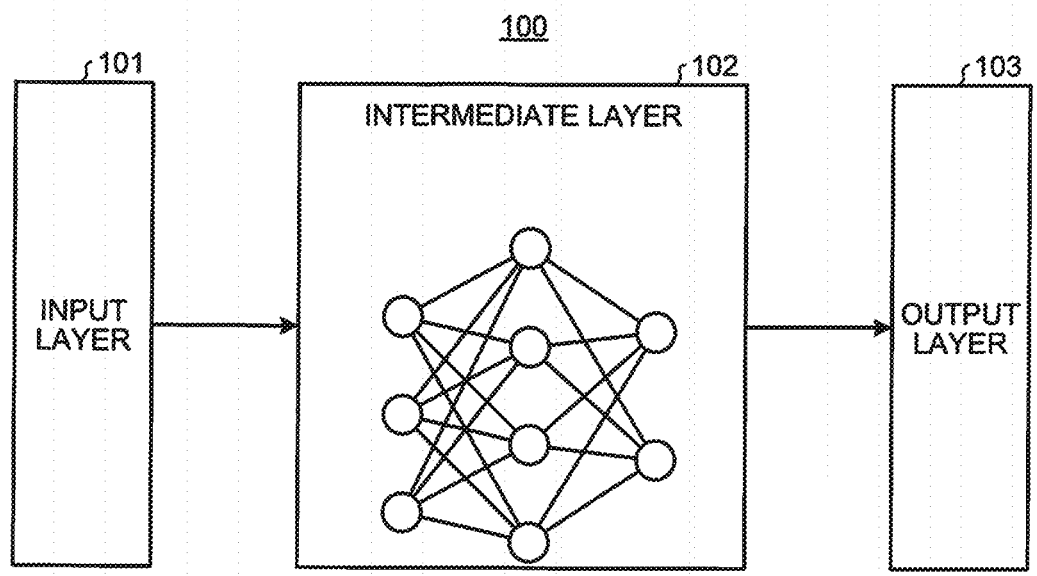
FIG. 3 is a diagram schematically illustrating a configuration of a neural network learned by a learning unit.

Hereinafter, deep learning using a neural network will be described as a specific example of machine learning. FIG. 3 is a diagram schematically illustrating a configuration of a neural network which the learning unit 222 learns. As illustrated in FIG. 3, a neural network 100 is a neural network of a forward propagation type and includes an input layer 101, an intermediate layer 102, and an output layer 103. The input layer 101 includes a plurality of nodes, and each of the nodes receives input of an input parameter different from one another. The intermediate layer 102 receives output from the input layer 101. The intermediate layer 102 has a multi-layered structure including a layer including a plurality of nodes receiving input from the input layer 101. The output layer 103 receives output from the intermediate layer 102 and outputs an output parameter. Machine learning using a neural network in which the intermediate layer 102 has a multilayer structure is called deep learning.

Figure 4:
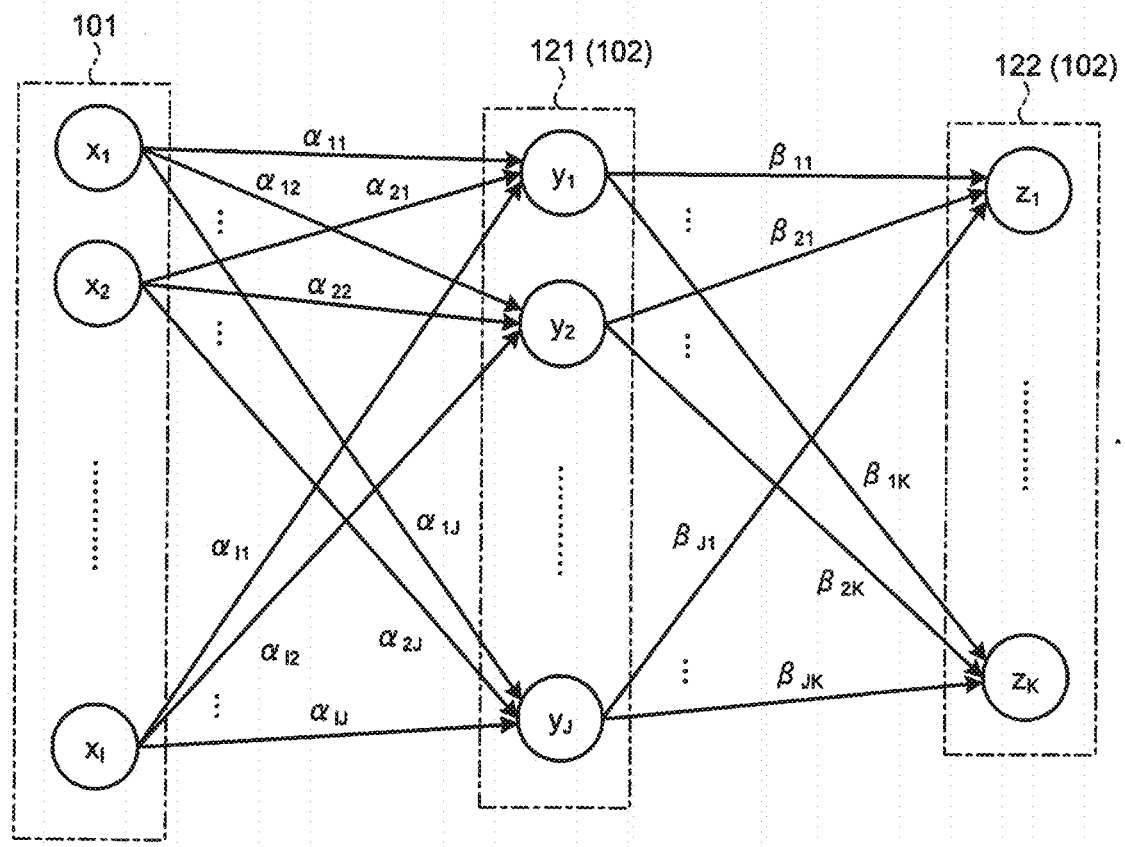
FIG. 4 is a diagram illustrating an outline of input and output of nodes included in the neural network.

FIG. 4 is a diagram for explaining an outline of input and output at nodes included in the neural network 100. FIG. 4 schematically illustrates a part of data input and output in the input layer 101 including I nodes, a first intermediate layer 121 including J nodes, and a second intermediate layer 122 including K nodes (where I, J, and K are positive integers) in the neural network 100. An input parameter $x_i$ (i=1, 2, . . . , I) is input to an i-th node from the top in the input layer 101. Hereinafter, a set of all input parameters will be referred to as "input parameters $\{x_i\}$".

Each of the nodes in the input layer 101 outputs a signal having a value obtained by multiplying an input parameter by a predetermined weight to each of the nodes in the adjacent first intermediate layer 121. For example, the i-th node from the top in the input layer 101 outputs, to a j-th (j=1, 2, . . . , J) node from the top in the first intermediate layer 121, a signal having a value $\alpha_{ij} x_i$ obtained by multiplying the input parameter $x_i$ by a weight $\alpha_{ij}$. The j-th node from the top in the first intermediate layer 121 receives input of a value $\Sigma_{i=1\ to\ I} \alpha_{ij} x_i + b^{(1)}_j$ which is obtained by adding a predetermined bias $b^{(1)}_j$ to a total of the output from the respective nodes in the input layer 101. Here, $\Sigma_{i=1\ to\ I}$ in the first term means to derive a sum for i=1, 2, . . . , I.

An output value $y_j$ of the j-th node from the top in the first intermediate layer 121 is represented as $y_j = S(\Sigma_{i=1\ to\ I} \alpha_{ij} x_i + b^{(1)}_j)$ as a function of the input value $\Sigma_{i=1\ to\ I} \alpha_{ij} x_i + b^{(1)}_j$ from the input layer 101 to the node. This function S is called an activation function. Examples of specific activation functions include, for example, a sigmoid function $S(u)=1/\{1+\exp(-u)\}$ and a rectified linear function (ReLU) $S(u)=\max(0, u)$. A non-linear function is often used as the activation function.

Each of the nodes in the first intermediate layer 121 outputs, to each of the nodes in the adjacent second intermediate layer 122, a signal having a value obtained by multiplying an input parameter by a predetermined weight. For example, the j-th node from the top in the first intermediate layer 121 outputs a signal having a value $\beta_{jk} y_j$ obtained by multiplying the input value $y_j$ by a weight $\beta_{jk}$ to a k-th (k=1, 2, . . . , K) node from the top in the second intermediate layer 122. The k-th node from the top in the second intermediate layer 122 receives input of a value $\Sigma_{j=1\ to\ J} \beta_{jk} y_j + b^{(2)}_k$ obtained by adding a predetermined bias $b^{(2)}_k$ to a total of the output from the respective nodes in the first intermediate layer 121. Here, $\Sigma_{j=1\ to\ J}$ in the first term means to derive a sum for j=1, 2, . . . , J.

An output value $z_k$ of the k-th node from the top in the second intermediate layer 122 is represented as $z_k = S(\Sigma_{j=1\ to\ J} \beta_{jk} y_j + b^{(2)}_k)$ using an activation function having an input value $\Sigma_{j=1\ to\ J} \beta_{jk} y_j b^{(2)}_k$ from the first intermediate layer 121 to that node as a variable.

Sequential repetitions along the forward direction from the input layer 101 side toward the output layer 103 side in the above manner results in a single output parameter Y finally output from the output layer 103. Hereinafter, the weights and biases included in the neural network 100 are collectively referred to as "network parameter w". The network parameter w is a vector containing all the weights and biases of the neural network 100 as components thereof.

The learning unit 222 performs an operation to update the network parameter on the basis of the output parameter Y calculated by inputting the input parameters $\{x_i\}$ to the neural network 100 and an output parameter (target output) $Y_0$ forming an input/output data set together with the input parameters $\{x_i\}$. Specifically, the network parameter w is updated by performing an operation to minimize an error between the two output parameters Y and $Y_0$. For this, the stochastic gradient descent is often used. Hereinafter, a set of the input parameters $\{x_i\}$ and the output parameter Y ($\{x_i\}$, Y) will be collectively referred to as "learning data".

The outline of the stochastic gradient descent is described below. The stochastic gradient descent is a method for updating the network parameter w such that a gradient $\nabla_w E(w)$ obtained from differentiation for each component of the network parameter w of an error function $E(w)$ defined using two output parameters Y and $Y_0$ is minimized. The error function is defined, for example, by a squared error $|Y-Y_0|^2$ of the output parameter Y of the learning data and the output parameter $Y_0$ of the input/output data set. The gradient $\nabla_w E(w)$ is a vector containing differential values of components of the network parameter w of the error function $E(w)$ such as $\partial E(w)/\partial \alpha_{ij}$, $\partial E(w)/\partial \beta_{jk}$, $\partial E(w)/\partial b^{(1)}_j$, and $\partial E(w)/\partial b^{(2)}_k$ (where i=1 to I, j=1 to J, and k=1 to K) as components.

In the stochastic gradient descent, the network parameter w is sequentially updated using a predetermined learning rate η determined automatically or manually in such a manner as: $w' = w - \eta \nabla_w E(w)$, $w'' = w' - \eta \nabla_w E(w')$, . . . . Note that the learning rate η may be modified during the learning. In a case of a more general stochastic gradient descent, the error function $E(w)$ is defined by random extraction from among samples including the entire learning data. The number of pieces of learning data extracted at this time is not limited to one, and may be a part of learning data stored in the learning data storing unit 233.

An error back propagation is known as a method for efficiently performing calculation of the gradient $\nabla_w E(w)$. The error back propagation is a method of calculating components of the gradient $\nabla_w E(w)$ by tracing backward from the output layer to the intermediate layer, and then to the input layer on the basis of the error between the target output $Y_0$ in the output layer and the output parameter Y after the learning data ($\{x_i\}$, Y) has been calculated. The learning unit 222 updates the network parameter w by calculating all components of the gradient $\nabla_w E(w)$ using the error back propagation and then applying the above stochastic gradient descent using the calculated gradient $\nabla_w E(w)$.

Supplying Vehicle

Figure 5:
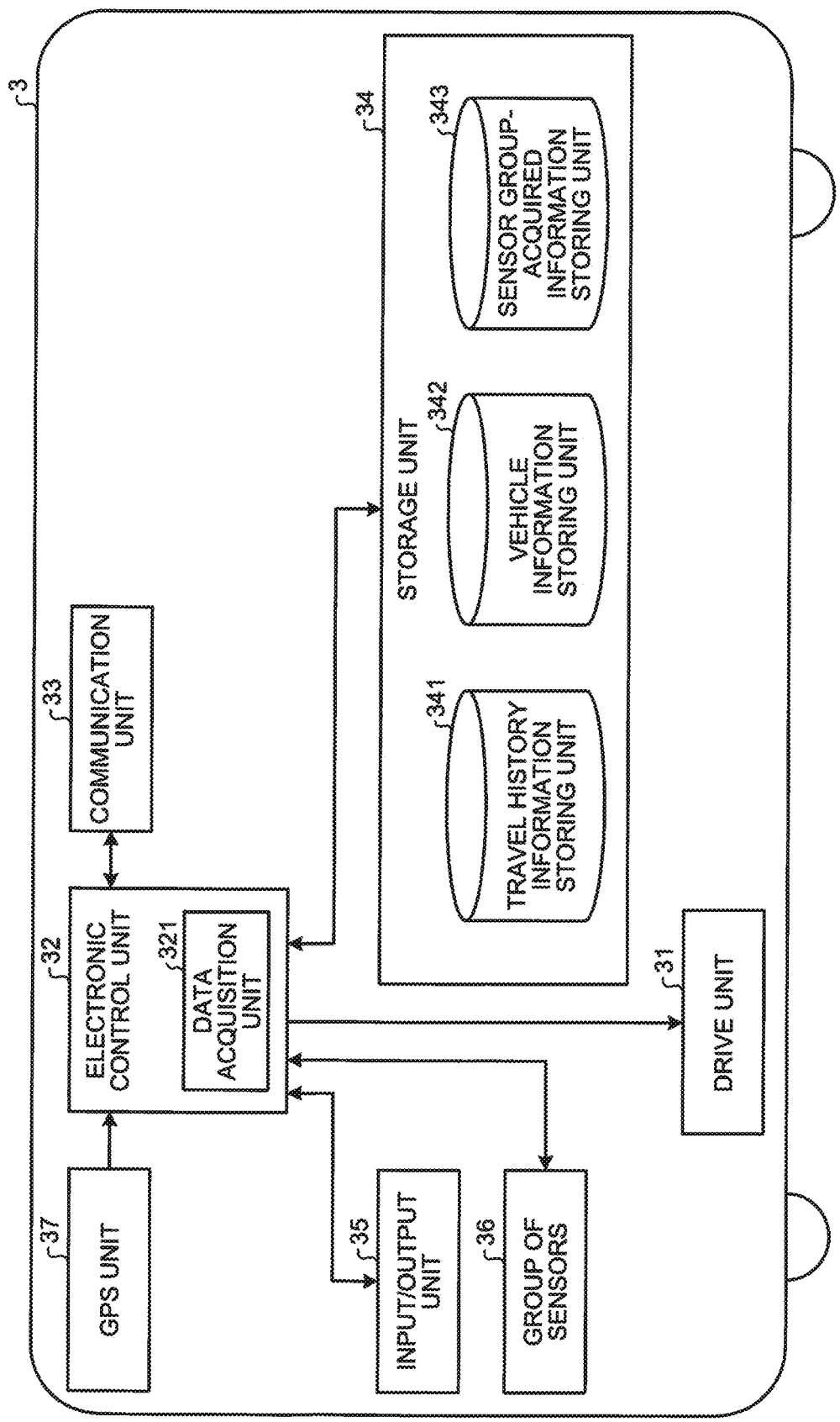
FIG. 5 is a block diagram schematically illustrating a configuration of a supplying vehicle illustrated in FIG. 1.

A vehicle 3 as a supplying vehicle may be a vehicle that travels when a driver drives the vehicle or an autonomous traveling vehicle capable of autonomously traveling according to a given driving instruction. FIG. 5 is a block diagram schematically illustrating a configuration of a vehicle 3. As illustrated in FIG. 5, the vehicle 3 includes a drive unit 31, an electronic control unit 32, a communication unit 33, a storage unit 34, an input/output unit 35, a group of sensors 36, and a GPS unit 37.

The drive unit 31 is a known drive unit necessary for the vehicle 3 to travel. Specifically, the vehicle 3 includes an engine which is an internal combustion engine serving as a driving source, a drive transmission mechanism that transmits the driving force of the engine, driving wheels for traveling, etc. The engine of the vehicle 3 is capable of generating electricity using a motor or the like by being driven by combustion of fuel. The generated electric power is charged in a rechargeable battery.

The electronic control unit 32 and the storage unit 34 are similar to the control unit 22 and the storage unit 23 described above, respectively, in a physical sense. The electronic control unit 32 integrally controls the operation of various components mounted on the vehicle 3. The electronic control unit 32 executes the function of a data acquisition unit 321 by executing a program stored in the storage unit 34. The data acquisition unit 321 acquires various types of data detected by the group of sensors 36 and stores these pieces of data in a sensor group-acquired information storing unit 343 as sensor information.

The communication unit 33 as a transmission unit and a reception unit includes, for example, an in-vehicle communication module (data communication module (DCM)) that communicates with at least the control support server 2 by wireless communication via the network 10.

The storage unit 34 includes a travel history information storing unit 341, a vehicle information storing unit 342, and the sensor group-acquired information storing unit 343. The travel history information storing unit 341 stores travel history information including the speed, the acceleration, a travel time range, a travel route, and a traveling region of the vehicle 3, congestion information, the outside air temperature or humidity, and the weather in a manner allowing for accumulation and update. The vehicle information storing unit 342 stores vehicle information including a vehicle type, the total travel distance, the remaining amount of fuel, the current position, and the like in a manner allowing for accumulation and update. The sensor group-acquired information storing unit 343 stores various types of data detected by the group of sensors 36 as sensor information in a manner allowing for accumulation and update.

The input/output unit 35 includes a touch panel display, a speaker microphone and the like. The input/output unit 35 as an input means includes a user interface such as a keyboard, an inputting button, a lever, and a touch panel provided by being stacked on a display such as liquid crystal. Predetermined information is input to the electronic control unit 32 when a user or the like operates the touch panel display or utters sound to the speaker microphone. The input/output unit 35 as an output means is capable of externally notifying predetermined information in accordance with control by the electronic control unit 32 such as by displaying characters, figures or the like on the screen of the touch panel display or outputting sound from the speaker microphone.

The group of sensors 36 includes sensors for measuring the state of the vehicle 3 such as a water temperature sensor that detects the temperature of engine cooling water (cooling water temperature), an intake air temperature sensor that detects the temperature of intake air into the engine, an atmospheric pressure sensor which detects the atmospheric pressure, an oil temperature sensor which detects the temperature of engine oil, an A/F sensor which detects the oxygen concentration in exhaust gas, and a current sensor which detects the charge state of a battery. The group of sensors 36 also includes sensors related to the traveling of the vehicle 3 such as a vehicle speed sensor and an acceleration sensor which detect the speed and the acceleration of the vehicle 3, respectively. The group of sensors 36 may include an outside air temperature sensor which detects the outside air temperature, a humidity sensor which detects the outside air humidity, and other sensors. The group of sensors 36 may further include, for example, a compartment interior sensor capable of detecting various conditions in the compartment or an imaging device such as an imaging camera.

The GPS unit 37 receives radio waves from global positioning system (GPS) satellites and detects the position of the vehicle 3. The detected position is retrievably stored in the vehicle information storing unit 342 as positional information in the vehicle information. Note that, as a method of detecting the position of the vehicle 3, a method obtained by combining light detection and ranging/laser imaging detection and ranging (LiDAR) and a three-dimensional digital map may be employed.

Requesting Vehicle

Figure 6:
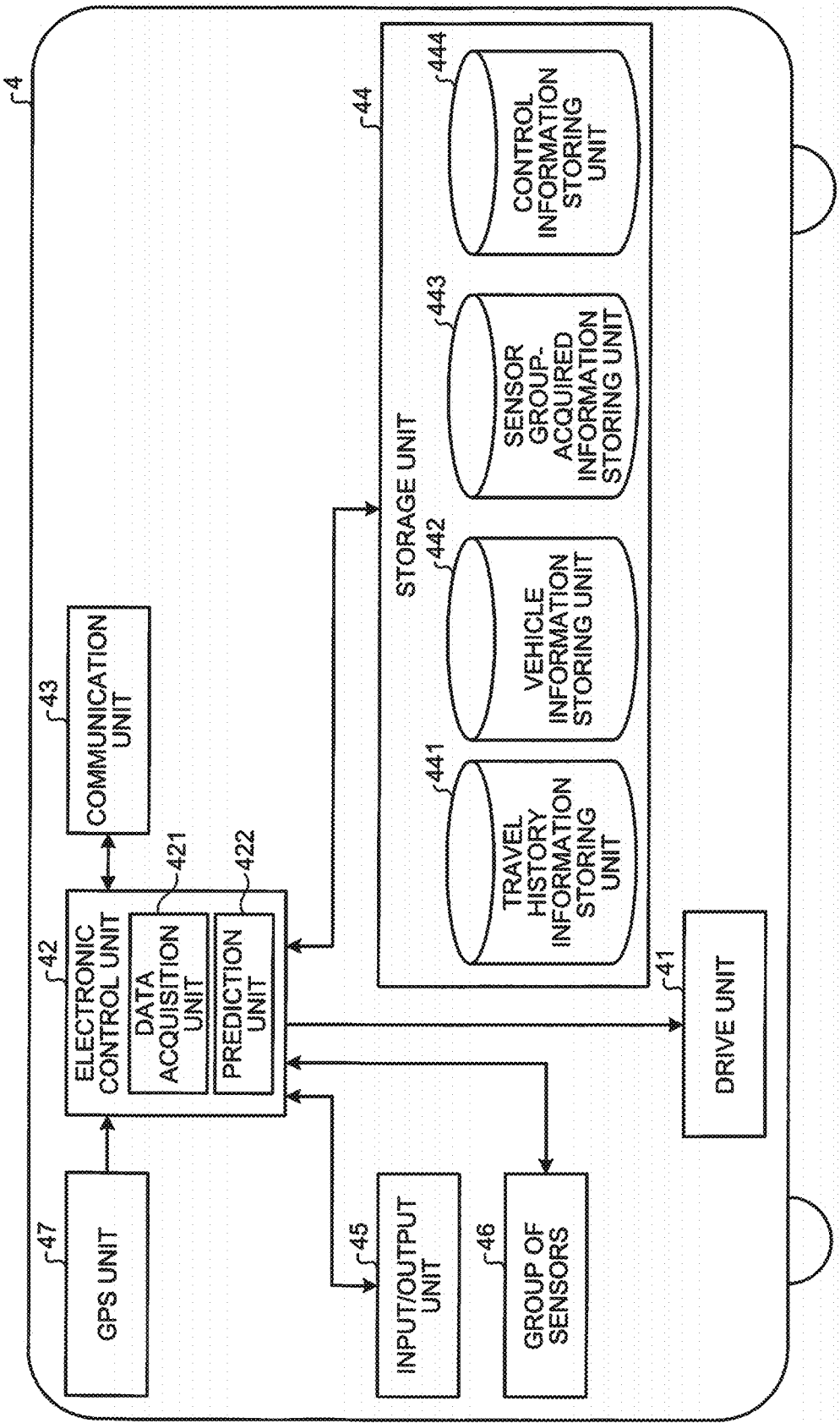
FIG. 6 is a block diagram schematically illustrating a configuration of a requesting vehicle illustrated in FIG. 1.

The requesting vehicle 4, as a vehicle control of which is supported, may be a vehicle that travels when a driver drives the vehicle or an autonomous traveling vehicle capable of autonomously traveling according to a given driving instruction. FIG. 6 is a block diagram schematically illustrating a configuration of the vehicle 4. As illustrated in FIG. 6, the vehicle 4 includes a drive unit 41, an electronic control unit 42, a communication unit 43, a storage unit 44, an input/output unit 45, a group of sensors 46, and a GPS unit 47. The drive unit 41, the communication unit 43, the input/output unit 45, the group of sensors 46, and the GPS unit 47 are similar to the drive unit 31, the communication unit 33, the input/output unit 35, the group of sensors 36, and the GPS unit 37 in the vehicle 3, respectively.

The electronic control unit 42 and the storage unit 44 are similar to the control unit 22 and the storage unit 23 described above, respectively, in a physical sense. The electronic control unit 42 and the storage unit 44 form a vehicle control device that controls each component of the vehicle 4. The electronic control unit 42 integrally controls the operation of various components mounted on the vehicle 4. The electronic control unit 42 executes the functions of a data acquisition unit 421 and a prediction unit 422 by executing a program stored in the storage unit 44. The data acquisition unit 421 is similar to the data acquisition unit 321 in the electronic control unit 32 of the vehicle 3. The prediction unit 422 calculates a prediction value which is an output parameter by inputting, as input parameters, various types of data acquired by the data acquisition unit 421 into a learned model stored in a control information storing unit 444 of the storage unit 44.

The storage unit 44 includes a travel history information storing unit 441, a vehicle information storing unit 442, a sensor group-acquired information storing unit 443, and a control information storing unit 444. The travel history information storing unit 441, the vehicle information storing unit 442, and the sensor group-acquired information storing unit 443 are similar to the travel history information storing unit 341, the vehicle information storing unit 342, and the sensor group-acquired information storing unit 343, respectively. The control information storing unit 444 stores at least one of a learned model, a prediction value calculated by the prediction unit 422, and a prediction value received from the control support server 2 for use in the control of each component by the electronic control unit 42.

Figure 7:
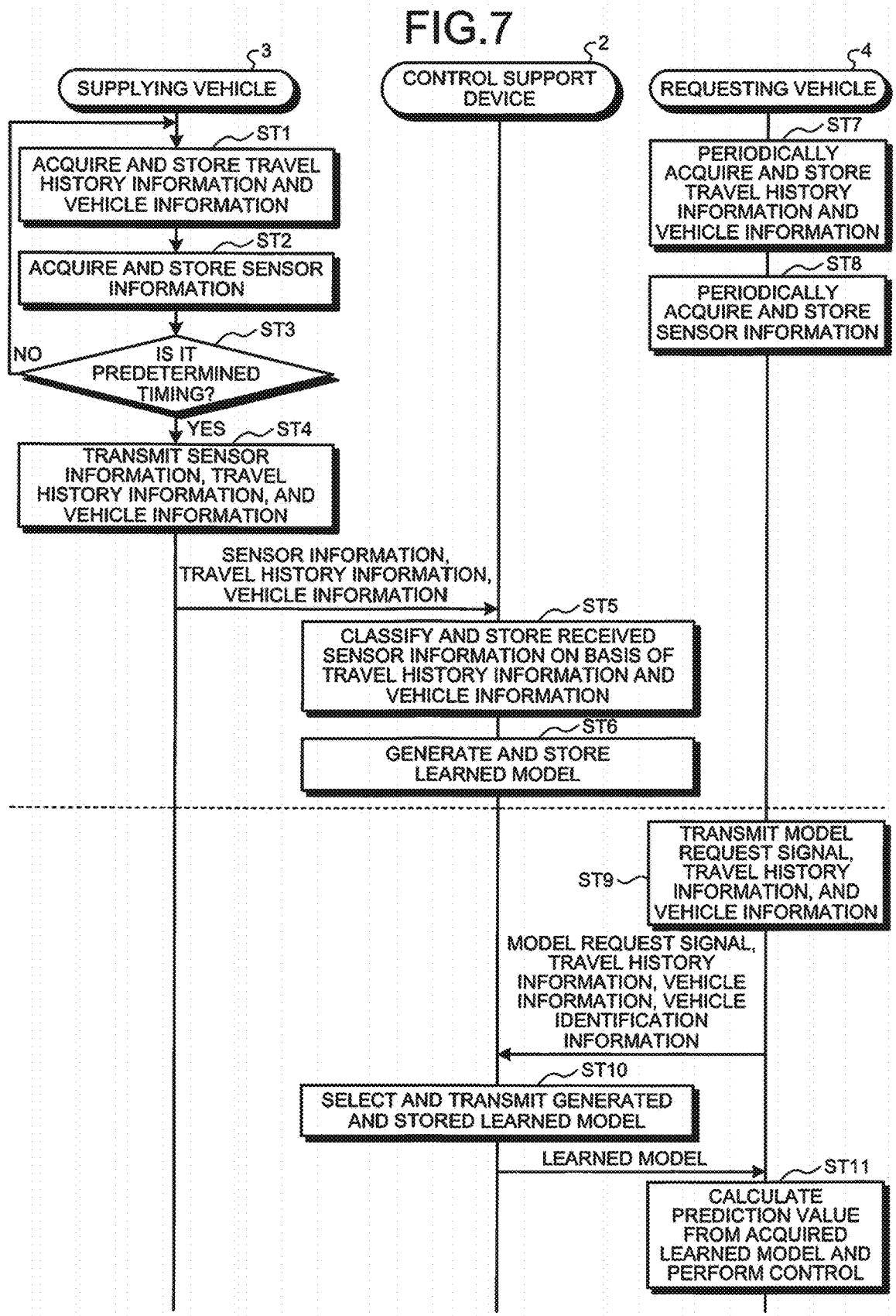
FIG. 7 is a flowchart illustrating the flow of processing of a control support method according to the first embodiment.

FIG. 7 is a flowchart illustrating a flow of processing of a control support method in the control support system 1 according to the first embodiment. In the supplying vehicle 3, the data acquisition unit 321 of the electronic control unit 32 acquires travel history information and vehicle information in step ST1 as illustrated in FIG. 7. The data acquisition unit 321 stores the acquired travel history information and the vehicle information in the travel history information storing unit 341 and the vehicle information storing unit 342, respectively. The data acquisition unit 321 acquires data detected by the group of sensors 36 and stores the detected data in the sensor group-acquired information storing unit 343 as sensor information in step ST2. Note that steps ST1 and ST2 may be performed in the reverse order or in parallel.

Next, the flow proceeds to step ST3, in which the electronic control unit 32 determines whether the current time is predetermined timing set in advance. The predetermined timing may be periodic time at predetermined time intervals, or may be predetermined time set in advance. If the electronic control unit 32 determines that the current time is not the predetermined timing (step ST3: No), steps ST1 and ST2 are repeatedly executed. If the electronic control unit 32 determines that the predetermined timing has been reached (step ST3: Yes), the flow proceeds to step ST4, in which the data acquisition unit 321 associates the sensor information having been acquired and stored with the travel history information and the vehicle information and transmits the associated information to the control support server 2 via the communication unit 33. Note that the association of the sensor information with the travel history information and the vehicle information is only required to be performed after acquisition of the sensor information, the travel history information, and the vehicle information and before transmission of these pieces of information.

In step ST5, the data acquisition unit 221 of the control unit 22 of the control support server 2 classifies the sensor information received from the vehicle 3 on the basis of the travel history information and the vehicle information and stores the sensor information in the input/output data set storing unit 232. As a result, the sensor information is classified as an input/output data set on the basis of the travel history information and the vehicle information.

Next, the flow proceeds to step ST6, in which the learning unit 222 extracts sensor information used for control from the various types of sensor information stored in the input/output data set storing unit 232 in association with travel history information and vehicle information. The learning unit 222 performs machine learning using the neural network 100 using the extracted sensor information as an input/output data set. As a result, the learning unit 222 generates a learned model and stores the learned model in the learned model storing unit 231 in association with the travel history information and the vehicle information.

The processing of steps ST1 to ST6 is repeatedly executed between the control support server 2 and the plurality of supplying vehicles 3. As a result, learned models associated with various types of travel history information are accumulated in the learned model storing unit 231 of the control support server 2. The learning unit 222 of the control unit 22 may further associate the generated learned model with the vehicle information and thereby accumulate the learned model in the learned model storing unit 231. A learned model generated in the past may be updated by a new learned model that has a high degree of coincidence with travel history information associated with the learned model in the past. Moreover, a new learned model may be generated, for example, by merging and averaging a plurality of learned models having associated travel history information close to each other. Note that when learned models are averaged, this can be performed by means such as averaging a network parameter w of each of the plurality of learned models for each node. Furthermore, the number of nodes may be modified. The learning unit 222 may further refer to vehicle information and merge or update a plurality of learned models. As a result, generated learned models are stored in the learned model storing unit 231 while being in association with travel history information, accumulated, updated, or merged and averaged. In this manner, the processing of generating a learned model in the control support system 1 completes.

Independent from the processing of steps ST1 to ST6, processing similar to steps ST1 and ST2 is performed in the requesting vehicle 4. That is, the data acquisition unit 421 of the electronic control unit 42 in the vehicle 4 acquires travel history information and vehicle information of the vehicle 4 in step ST7. The data acquisition unit 421 stores the acquired travel history information and the vehicle information in the travel history information storing unit 441 and the vehicle information storing unit 442, respectively. The data acquisition unit 421 acquires data detected by the group of sensors 46 and stores the detected data in the sensor group-acquired information storing unit 443 as sensor information in step ST8. Note that steps ST7 and ST8 may be performed in the reverse order or in parallel.

After the processing of steps ST1 to ST8 are executed, the control support server 2 executes control support processing for the vehicle 4. First, the communication unit 43 of the vehicle 4 transmits a model request signal, the travel history information, the vehicle information, and vehicle identification information to the control support server 2 in step ST9. Note that the vehicle identification information may be included in the vehicle information.

In step ST10, the selection unit 223 of the control unit 22 first selects and retrieves at least one learned model associated with travel history information having the highest degree of coincidence from the learned model storing unit 231 on the basis of the travel history information received from the vehicle 4. The selection unit 223 may further select at least one learned model on the basis of travel history information and vehicle information having a high degree of coincidence on the basis of the degree of coincidence of the vehicle information. The selection unit 223 transmits the selected learned model to the vehicle 4 that has transmitted the model request signal by referring to the vehicle identification information.

In step ST11, the prediction unit 422 of the electronic control unit 42 calculates a prediction value using the learned model received from the control support server 2 via the communication unit 43 and performs control. That is, first, the data acquisition unit 421 stores the received learned model in the control information storing unit 444. Then, the prediction unit 422 selects and retrieves sensor information necessary for performing control from the sensor group-acquired information storing unit 443 and uses the sensor information as input parameters. The prediction unit 422 inputs the input parameters to the received learned model to calculate the prediction value. The electronic control unit 42 controls the drive unit 41 and other components using the calculated prediction value.

Note that the supplying vehicle 3 and the requesting vehicle 4 mentioned above may be the same vehicle. In the case where the vehicles 3 and 4 are the same vehicle, instead of transmission and reception of the travel history information, the control support server 2 may generate a learned model on the basis of the vehicle identification information. The steps ST1 to ST11 described above are repeatedly executed in the control support system 1. This further optimizes a generated learned model.

FIRST EXAMPLE

Hereinafter, a specific example of control using a learned model will be described. In the first example, used as input parameters are the maximum in-catalyst oxygen storage amount (maximum OSA) and a travel distance of the vehicle, and the output parameter is a catalyst warm-up retardation amount at the next start of the engine (hereinafter, may be simplified as a "catalyst warm-up retardation amount"). In this case, a learned model is generated in the control support server 2 using, as an input/output data set, data of the maximum OSA and the total travel distance of the vehicle 3 measured by the group of sensors 36 of the vehicle 3 and data of the catalyst warm-up retardation amount detected and controlled in the vehicle 3 on the basis of the maximum OSA and the total travel distance. In the vehicle 4, the prediction unit 422 inputs the maximum OSA and the total travel distance measured by the group of sensors 46 as input parameters into the learned model received from the control support server 2 to calculate a prediction value of the catalyst warm-up retardation amount. The electronic control unit 42 of the vehicle 4 controls the catalyst warm-up retardation amount in accordance with the prediction value calculated by the prediction unit 422. This control allows catalyst warm-up to be controlled depending on the degree of deterioration even when deterioration of a catalyst for purification of exhaust gas mounted on the vehicle 4 progresses, and thus a large amount of emission of HC and CO as tailpipe emission can be suppressed.

SECOND EXAMPLE

In a second example, used as input parameters are an average vehicle speed and an average acceleration, and the output parameter is a state of charge (SOC) value at which output-constant operation is started (hereinafter, also referred to as a "start SOC value"). In this case, a learned model is generated in the control support server 2 using, as an input/output data set, data of an average vehicle speed and an average acceleration measured by the group of sensors 36 of the vehicle 3 and derived by the control unit 22 or the electronic control unit 32 and data of the start SOC value detected and controlled in a plurality of vehicles 3 on the basis of the average vehicle speed and the average acceleration. In the vehicle 4, the prediction unit 422 inputs the average vehicle speed and the average acceleration measured by the group of sensors 46 and calculated by the electronic control unit 42 as input parameters into the learned model received from the control support server 2 to calculate a prediction value of the start SOC value. The electronic control unit 42 of the vehicle 4 sets the start SOC value in accordance with the prediction value calculated by the prediction unit 422 to control output-constant operation.

In vehicles such as plug-in hybrid vehicles (PHVs), output-constant operation is started and catalyst warm-up is started when the SOC value drops below a predetermined value. There is a possibility that catalyst warm-up becomes insufficient when a driver of the vehicle 4 performs driving at a high speed or with frequent sudden acceleration since the SOC value drops before the catalyst warm-up is completed and switching over to normal driving occurs. Therefore, the start SOC value can be set to an optimum value by inputting the average vehicle speed and the average acceleration as input parameters into the learned model and calculating the prediction value of the start SOC value as the output parameter. Therefore, the possibility of insufficient catalyst warm-up in vehicles such as PHVs can be reduced.

THIRD EXAMPLE

In a third example, used as input parameters are the maximum OSA and a travel distance of the vehicle, and the output parameter is the catalyst bed temperature at which increase control of fuel is executed in order to suppress over temperature (OT) of the catalyst (hereinafter also referred to as "catalyst estimated bed temperature"). In this case, a learned model is generated in the control support server 2 using, as an input/output data set, data of the maximum OSA and the total travel distance of the vehicle 3 detected and measured by the group of sensors 36 of the vehicle 3 and data of the catalyst estimated bed temperature detected and controlled in the vehicle 3 on the basis of the maximum OSA and the total travel distance. In the vehicle 4, the prediction unit 422 inputs the maximum OSA and the total travel distance measured by the group of sensors 46 as input parameters into the learned model received from the control support server 2 to calculate a prediction value of the catalyst estimated bed temperature. The electronic control unit 42 of the vehicle 4 sets the catalyst estimated bed temperature in accordance with the prediction value calculated by the prediction unit 422 and performs control to increase the fuel supplied to the engine when the catalyst bed temperature reaches the set catalyst estimated bed temperature. This control allows the catalyst estimated bed temperature to be lowered depending on the state of deterioration of a catalyst for purification of exhaust gas mounted on the vehicle 4, and thus occurrence of OT of the catalyst can be suppressed.

FOURTH EXAMPLE

In a fourth example, used as input parameters are the maximum OSA, a travel distance of the vehicle, an average speed, and an average acceleration in the vehicle 4, and the output parameter is a catalyst estimated bed temperature. In this case, a learned model is generated in the control support server 2 using, as an input/output data set, data of the maximum OSA, the total travel distance, data of an average vehicle speed and an average acceleration of the vehicle 3 derived by the control unit 22 or the electronic control unit 32, and data of the catalyst estimated bed temperature detected and controlled in the vehicle 3 on the basis of the four types of data. In the vehicle 4, the prediction unit 422 inputs the maximum OSA, the total travel distance, the average vehicle speed, and the average acceleration of the vehicle 4 as input parameters into the learned model received from the control support server 2 to calculate a prediction value of the catalyst estimated bed temperature. The electronic control unit 42 of the vehicle 4 sets the catalyst estimated bed temperature in accordance with the prediction value calculated by the prediction unit 422 and performs control to increase the fuel when the catalyst bed temperature reaches the set catalyst estimated bed temperature. With this control, similar effects to those of the third example can be obtained. In addition, since there is a possibility that the catalyst bed temperature rises rapidly when a driver of the vehicle 4 performs driving at a high speed or with frequent sudden acceleration, the catalyst estimated bed temperature is reduced in such cases according to the fourth example to enable an increase of fuel supplied to the engine at a lower catalyst bed temperature. As a result, occurrence of OT of the catalyst can be suppressed even during driving at a high speed or with frequent sudden acceleration.

A plurality of examples selected from the above-described first to fourth examples may be executed in parallel in the same vehicle 4.

According to the first embodiment described above, a learned model is generated by machine learning using sensor information acquired from the plurality of vehicles 3 as an input/output data set, and when a model request signal is received from the vehicle 4 that executes predetermined control, a learned model associated with travel history information having the highest degree of coincidence with travel history information in the vehicle 4 is selected and transmitted to the vehicle 4, and a prediction value is calculated in the vehicle 4. As a result, a prediction value can be calculated in the vehicle 4 by the learned model having traveling conditions most similar to traveling conditions of the vehicle 4, and thus the control of the vehicle 4 by the prediction value can be appropriately supported.

Second Embodiment

Next, a control support method according to a second embodiment will be described. Configurations of a control support system 1, a control support server 2, and vehicles 3 and 4 according to the second embodiment are similar to those in the first embodiment. In the second embodiment, however, processing by the control support server 2 and information received by the vehicle 4 are different from those in the first embodiment. In the second embodiment, the control support server 2 calculates a prediction value for control of the vehicle 4 using a learned model having been generated, and the vehicle 4 acquires the prediction value.

Figure 8:
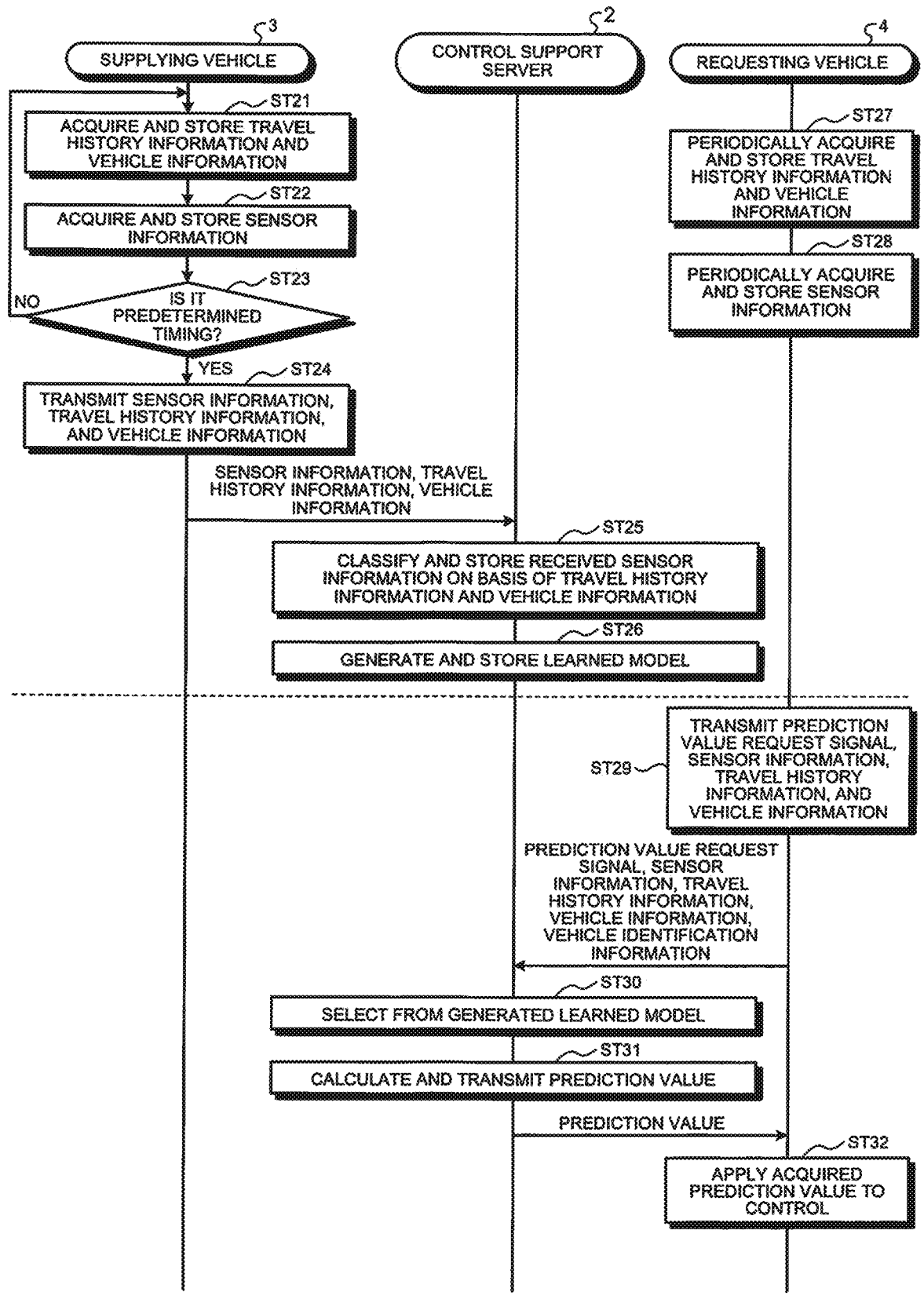
FIG. 8 is a flowchart illustrating the flow of processing of a control support method according to a second embodiment.

FIG. 8 is a flowchart for explaining the control support method according to the second embodiment. Steps ST21 to ST28 in FIG. 8 are similar to steps ST1 to ST8 illustrated in FIG. 7. In the second embodiment, the control support server 2 generates a learned model by steps ST21 to ST28. Note that steps ST21 to ST28 are repeatedly executed in the control support server 2 and a vehicle 3. As a result, in a learned model storing unit 231 of the control support server 2, generated learned models are accumulated in association with travel history information, or a plurality of learned models, having a high degree of coincidence of travel history information associated thereto, are merged and averaged to be updated to a new learned model. Note that vehicle information may be further associated, and in this case, a plurality of learned models having a high degree of coincidence in the travel history information and the vehicle information may be merged and averaged.

After the learned model is generated by the control support server 2, the control support server 2 executes control support processing for the vehicle 4. That is, the communication unit 43 of the vehicle 4 transmits a prediction value request signal as a parameter request signal, sensor information, travel history information, vehicle information, and the vehicle identification information to the control support server 2 in step ST29.

When the control support server 2 receives the prediction value request signal, the sensor information, the travel history information, the vehicle information, and the vehicle identification information from the vehicle 4, the flow proceeds to step ST30. The selection unit 223 of the control unit 22 selects at least one learned model associated with travel history information having the highest coincidence with the travel history information received from the vehicle 4 from among learned models stored in the learned model storing unit 231 in step ST30. Note that the selection unit 223 may select at least one learned model associated with travel history information and vehicle information having the highest degree of coincidence by further referring to the vehicle information received from the vehicle 4.

When the flow proceeds to step ST31, the prediction unit 224 calculates a prediction value using the selected learned model and transmits the prediction value. That is, the prediction unit 224 first selects sensor information necessary for performing control from the sensor information received from the vehicle 4 and uses the selected sensor information as input parameters. The prediction unit 224 inputs the input parameters to the selected learned model to calculate the prediction value. The prediction unit 224 transmits, through the communication unit 21, the calculated prediction value to the vehicle 4 which has transmitted the prediction value request signal on the basis of the vehicle identification information and the vehicle information.

When receiving the prediction value from the control support server 2 through the communication unit 43, the electronic control unit 42 of the vehicle 4 controls the drive unit 41 and other components using the acquired prediction value in step ST32. Specific examples of control of the drive unit 41 and other components using the prediction value are similar to the first to fourth examples described above. Moreover, the supplying vehicle 3 and the requesting vehicle 4 described above may be the same vehicle.

Note that in case where a part of sensor information as the input parameters that the control support server 2 receives from the vehicle 4 and inputs to the learned model is missing, the prediction unit 224 may calculate a provisional value to be supplemented to the missing sensor information to be used as an input parameter. This is effective in a case where the vehicle 4 is not provided with a sensor for acquiring sensor information necessary as input parameters of learned models. Furthermore, steps ST21 to ST32 described above are repeatedly executed in the control support system 1. This optimizes the calculated prediction value.

According to the second embodiment, the control support server 2 generates the learned model, calculates the prediction value corresponding to the sensor information received from the requesting vehicle 4, and transmits the calculated prediction value to the vehicle 4. This allows the vehicle 4 to perform control using the prediction value obtained from the learned model generated in the control support server 2, and thus similar effects to those of the first embodiment can be obtained. Furthermore, since calculation of the prediction value is executed in the control support server 2, it is not necessary to provide a prediction unit for calculating the prediction value in the vehicle 4. Therefore, the processing capacity of the vehicle 4 can be reduced as compared to the first embodiment, and thus the number of vehicles 4 capable of executing control using a learned model can be increased.

Third Embodiment

Next, a vehicle and a control support method according to a third embodiment will be described. Configurations of a control support system 1, a control support server 2, and a vehicle 4 according to the third embodiment are similar to those in the first embodiment, and information that the vehicle 4 receives is similar to that in the second embodiment. In the third embodiment, however, processing by the control support server 2 and a supplying vehicle 3 is different from that in the first and second embodiments. In the third embodiment, a learned model is generated by the supplying vehicle 3, and the control support server 2 calculates a prediction value for control in the requesting vehicle 4 using the generated learned model.

Supplying Vehicle

FIG. 9 is a block diagram schematically illustrating a configuration of a supplying vehicle 3A according to the third embodiment. As illustrated in FIG. 9, the vehicle 3A includes a drive unit 31, an electronic control unit 32, a communication unit 33, a storage unit 34, an input/output unit 35, a group of sensors 36, and a GPS unit 37 like the vehicle 3 according to the first embodiment illustrated in FIG. 5. In addition, in the vehicle 3A unlike in the vehicle 3, the electronic control unit 32 further includes a learning unit 322, and the storage unit 34 further includes an input/output data set storing unit 344, a learned model storing unit 345, and a learning data storing unit 346. The learning unit 322, the input/output data set storing unit 344, the learned model storing unit 345, and the learning data storing unit 346 are similar to the learning unit 222, the input/output data set storing unit 232, the learned model storing unit 231, and the learning data storing unit 233 in the control support server 2, respectively. That is, the vehicle 3A according to the third embodiment is a vehicle mounted with a control support device.

FIG. 10 is a flowchart illustrating the flow of processing of the control support method according to the third embodiment. In FIG. 10, steps ST41, ST42, ST44, ST47, and ST48 are similar to steps ST1, ST2, ST3, ST7, and ST8 illustrated in FIG. 7. Processing of steps ST41 and ST42 may be performed in the reverse order or in parallel, and processing of steps ST47 and ST48 may be performed in the reverse order or in parallel.

When the flow proceeds to step ST43 after execution of steps ST41 and ST42, the learning unit 322 of the electronic control unit 32 generates a learned model. That is, a data acquisition unit 321 of the electronic control unit 32 extracts sensor information to be used for control from various types of sensor information stored in a sensor group-acquired information storing unit 343. The data acquisition unit 321 further reads travel history information and vehicle information associated with the extracted sensor information from a travel history information storing unit 341 and a vehicle information storing unit 342, respectively. The data acquisition unit 321 causes the input/output data set storing unit 344 to store the extracted sensor information and the associated travel history information and vehicle information. Next, the learning unit 322 reads sensor information from the input/output data set storing unit 344 and performs machine learning using the neural network 100 using the read sensor information as an input/output data set. As a result, the learning unit 322 generates a learned model and stores the learned model in the learned model storing unit 345 in association with the travel history information and the vehicle information.

Then the flow proceeds to step ST44, in which the electronic control unit 32 determines whether the current time is predetermined timing set in advance. If the electronic control unit 32 determines that the current time is not the predetermined timing (step ST44: No), steps ST41 to ST43 are repeatedly executed.

If the electronic control unit 32 determines that the predetermined timing has been reached (step ST44: Yes), the flow proceeds to step ST45. In step ST45, the electronic control unit 32 associates the learned model that has been generated and stored with the travel history information and the vehicle information and transmits the learned model and the information to the control support server 2. Note that the association between the learned model and the travel history information and the vehicle information is only required to be performed after generation of the learned model and before transmission of the learned model.

In step ST46, the data acquisition unit 221 of the control support server 2 classifies the received learned model on the basis of the travel history information and the vehicle information and stores the learned model in the learned model storing unit 231. Independent of the processing of steps ST41 to ST46 described above, processing of steps ST47 and ST48 is performed in the requesting vehicle 4.

The processing of steps ST41 to ST48 is repeatedly executed between a plurality of supplying vehicles 3 and the control support server 2. As a result, in the learned model storing unit 231 of the control support server 2, generated learned models are accumulated in association with travel history information or updated to a new learned model having a high degree of coincidence, or a plurality of learned models, having a high degree of coincidence of travel history information associated thereto, are merged and averaged like in steps ST1 to ST6 illustrated in FIG. 7.

After the processing of steps ST41 to ST48 is executed, steps ST49 to ST52 are executed. Steps ST49 to ST52 are processing corresponding to steps ST29 to ST32, respectively, illustrated in FIG. 8 according to the second embodiment.

Note that the supplying vehicle 3A and the requesting vehicle 4 described above may be the same vehicle. In this case, when a learned model generated in the vehicle 3A (vehicle 4) is adopted as the learned model and a prediction value is calculated by the prediction unit 422 in vehicle 4 (vehicle 3A), communication between the vehicle 3A/4 and the control support server 2 can be omitted. However, the learned model may become over-trained in this case. In such a case, although the vehicles 3A and 4 are the same vehicle, a general-purpose learned model obtained by merging and averaging a plurality of learned models in the control support server 2 may be adopted as a learned model.

According to the third embodiment, the supplying vehicle 3 generates the learned model, and the control support server 2 calculates the prediction value on the basis of sensor information received from the requesting vehicle 4 and transmits the calculated prediction value to the vehicle 4. This allows the vehicle 4 to perform control using the prediction value obtained by the control support server 2 from the learned model generated in the vehicle 3, and thus similar effects to those of the first and second embodiments can be obtained.

Although the embodiments of the present disclosure have been specifically described above, the present disclosure is not limited to the embodiments described above, and various modifications based on the technical idea of the present disclosure may be employed. For example, the input parameters and the output parameters mentioned in the above embodiment are merely examples, and different input parameters or output parameters may be used as necessary.

For example, in the above-described embodiment, deep learning using the neural network has been described as an example of machine learning; however, machine learning based on other methods may be performed. For example, other supervised learning may be used such as a support vector machine, a decision tree, the naive Bayes, and the k-nearest neighbors. Alternatively, instead of supervised learning, semi-supervised learning may be used.

Other than data acquired from the group of sensors 46 of the vehicle 4, data obtained by road-to-vehicle communication or vehicle-to-vehicle communication, for example, may be used as input parameters as a part of an input/output data set or learning data.

By a control support device, a vehicle, a control a control support method, a recording medium, a learned model for causing a computer to function, and a method of generating the learned model according to an embodiment of the present disclosure, it is possible to provide support to allow control substantially equivalent to control using a learned model by machine learning to be executed even in a vehicle not mounted with a machine learning device.

According to an embodiment, since the selection unit selects the learned model to be transmitted to the vehicle, control of which is supported, from among the plurality of learned models generated by the learning unit by machine learning and transmits the selected learned model to the vehicle, optimizing the selection by the selection unit allows a learned model suitable for the vehicle, control of which is supported, to be transmitted to the vehicle. Thus, it is possible to perform control on the basis of the learned model generated by machine learning even in a case where the vehicle is not mounted with a machine learning device that generates a learned model.

According to an embodiment, since the learned model to be transmitted to the vehicle, control of which is supported, is selected from among the plurality of learned models generated by the learning unit by machine learning to input the input parameter of the vehicle to the learned model, and the calculated output parameter is transmitted to the vehicle. Thus, it is possible to perform control of the vehicle on the basis of the output parameter obtained by the learned model generated by machine learning even in a case where the vehicle is not mounted with a device that calculates the output parameter from the learned model.

According to an embodiment, since the learning unit generates the learned model associated with the travel history information on the basis of the sensor information associated with the travel history information, the plurality of learned models can be classified on the basis of the travel history information. Thus, the selection unit can select a learned model suitable for the vehicle on the basis of the travel history of the vehicle control of which is supported.

According to an embodiment, since the learned model generated by the control support device can be stored in the external server, the required capacity of the storage unit in the control support device can be reduced. Moreover, since there is no need to generate a new learned model in the server, the processing capacity of machine learning in the server can be reduced.

According to an embodiment, since the output parameter can be calculated in the server from the sensor information from the vehicle control of which is supported, the output parameter calculated by the learned model can be used to control the vehicle even in a case where the vehicle is not mounted with a device for calculating the output parameter from the learned model.

According to an embodiment, since the plurality of learned models obtained from the plurality of control support devices can be accumulated, merged, or averaged, the learned models can be optimized. Moreover, since the output parameter calculated by inputting the input parameter of the vehicle, control of which is supported, to the learned model is transmitted to the vehicle, it is possible to perform control of the vehicle on the basis of the output parameter calculated by the learned model generated by machine learning even in a case where the vehicle is not mounted with a device that calculates the output parameter from the learned model. Furthermore, since the server selection unit can select the learned model on the basis of the travel history of the vehicle control of which is supported, a learned model suitable for the vehicle can be selected from the optimized learned models.

According to an embodiment, since the user of the supplying vehicle can receive a consideration for transmission of the sensor information as a reward, it is possible to reduce the discomfort of transmitting information related to the user. As for the administrator of the control support device, the learned model or the output parameter can be further optimized since more information can be collected. In addition, the user of the vehicle control of which is supported can use the learned model generated on the basis of the various types of information transmitted from the supplying vehicle, and the administrator of the control support device can ensure the reward to be paid to the user of the supplying vehicle. This facilitates the provision of services using the control support device to spread.

According to an embodiment, it is possible to perform control in the vehicle control of which is supported using the catalyst warm-up retardation amount, the SOC value for starting output-constant operation, and the catalyst bed temperature for executing increase control of fuel obtained using the learned model.

According to an embodiment, the vehicle can receive the learned model from the server by transmitting the model request signal to the server and can receive the calculated output parameter from the server by transmitting the parameter request signal and the sensor information of the vehicle, and thus it is possible to execute control using the learned model in the vehicle control device of the vehicle.

According to an embodiment, since the supplying vehicle can transmit the input/output data set for performing machine learning in the server, the server can generate a learned model by machine learning.

According to an embodiment, since the learned model can be generated on the vehicle side and this learned model can be stored in the external server, the capacity required for the storage unit in the vehicle control device of the vehicle can be reduced, and the processing capacity of machine learning in the server can be reduced.

According to an embodiment, since a learned model generated on the basis of deep learning using the neural network can be provided in association with travel history information, the control of the vehicle using the learned model can be appropriately supported.

According to an embodiment, the control of the vehicle can be appropriately supported, and a learned model associated with the travel history information can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control support device for supporting control of a vehicle using a learned model obtained by machine learning, the control support device comprising:
    a data acquisition unit configured to acquire sensor information, which is related to a state of an inside or an outside of a supplying vehicle that supplies parameters to be used for the machine learning;
    a learning unit configured to generate a learned model by performing the machine learning using an input/output data set, which is the sensor information acquired by the data acquisition unit and is data including input parameters and an output parameter of the learned model; and
    a transmission unit configured to transmit at least one of the generated learned model and an output parameter calculated by inputting sensor information of the vehicle, control of which is supported, to the generated learned model as an input parameter,
    wherein the output parameter comprises at least one of
        a catalyst warm-up retardation amount of the vehicle, or
        a state of charge (SOC) value of the vehicle.

2. The control support device according to claim 1, further comprising:

a selection unit configured to select a learned model to be transmitted to the vehicle, from among a plurality of learned models.

3. The control support device according to claim 1, further comprising:
a charge processing unit configured to execute
processing of calculating a consideration for support of the control for a user of the vehicle,
processing of calculating a reward for provision of the sensor information for a user of the supplying vehicle, and
processing of outputting calculated results of the processing of calculating the reward.

4. A control support device for supporting control of a vehicle using a learned model obtained by machine learning, the control support device comprising:
a data acquisition unit configured to acquire sensor information, which is related to a state of an inside or an outside of a supplying vehicle that supplies a parameter used for the machine learning;
a learning unit configured to generate a plurality of learned models by performing the machine learning using an input/output data set, which is the sensor information acquired by the data acquisition unit from a plurality of the supplying vehicles and is data including input parameters and an output parameter of the learned model;
a selection unit configured to select a learned model to be transmitted to the vehicle, control of which is supported, from among the plurality of learned models; and
a transmission unit configured to transmit the selected learned model to the vehicle.

5. The control support device according to claim 4,
wherein the data acquisition unit is configured to further acquire travel history information of the supplying vehicle associated with the sensor information,
the learning unit is configured to associate the generated learned model with the travel history information, and
the selection unit is configured to select a learned model, which is associated with travel history information having a high degree of coincidence with travel history information of the vehicle, from among a plurality of the generated learned models.

6. A control support device for supporting control of a vehicle using a learned model obtained by machine learning, the control support device comprising:
a data acquisition unit configured to acquire sensor information, which is related to a state of an inside or an outside of a supplying vehicle that supplies parameters to be used for the machine learning;
a learning unit configured to generate a plurality of learned models by performing the machine learning using an input/output data set, which is the sensor information acquired by the data acquisition unit from a plurality of the supplying vehicles and is data including input parameters and an output parameter of the learned model;
a selection unit configured to select a learned model from among the plurality of learned models;
a prediction unit configured to calculate an output parameter, which is obtained by inputting sensor information of the vehicle, control of which is supported, to the selected learned model as input parameters; and
a transmission unit configured to transmit the calculated output parameter to the vehicle.

7. A control support device communicating with a server storing a learned model obtained by machine learning, the control support device supporting control of a vehicle using the learned model, the control support device comprising:
a data acquisition unit configured to acquire sensor information, which is related to a state of an inside or an outside of a supplying vehicle, the data acquisition unit being mounted on the supplying vehicle that obtains parameters to be used for the machine learning;
a learning unit configured to generate a learned model by performing the machine learning using an input/output data set, which is the sensor information acquired by the data acquisition unit and is data including input parameters and an output parameter of the learned model; and
a transmission unit configured to transmit the generated learned model to the server.

8. The control support device according to claim 7,
wherein the server is configured to transmit, to the vehicle, an output parameter obtained by inputting sensor information of the vehicle, control of which is supported, as an input parameter, to a learned model retrieved or generated from a plurality of learned models each received from a plurality of the control support devices.

9. The control support device according to claim 7,
wherein the server comprises:
a server selection unit configured to select a learned model from a plurality of learned models, which are obtained by accumulating, merging, or updating a plurality of learned models each received from a plurality of the control support devices;
a server prediction unit configured to calculate an output parameter obtained by inputting sensor information of the vehicle, control of which is supported, to the selected learned model as an input parameter; and
a server communication unit configured to transmit the output parameter to the vehicle.

10. The control support device according to claim 9,
wherein the server is configured to further receive travel history information, which is associated with the learned model in the supplying vehicle, and travel history information of the vehicle, and
the server selection unit is configured to select a learned model, which is associated with travel history information having a high degree of coincidence with the travel history information of the vehicle, from among the plurality of learned models, which are obtained by accumulation, merging, or updating.

11. The control support device according to claim 7, further comprising:
a charge processing unit configured to execute processing of calculating a consideration for support of the control for a user of the vehicle, processing of calculating a reward for provision of the sensor information for a user of the supplying vehicle, and processing of outputting the calculated results.

12. The control support device according to claim 7,
wherein the sensor information includes at least one type of information selected from information of a maximum in-catalyst oxygen storage amount, information of a travel distance, information of an average speed, and information of an average acceleration in the vehicle, and the output parameter is a catalyst warm-up retardation amount, an SOC value for starting output-constant operation, or a catalyst bed temperature for executing increase control of fuel.

13. A vehicle comprising a vehicle control device communicating with a server which stores a learned model obtained by machine learning,
wherein the server comprises:
a server storage unit configured to store the learned model, which is generated by the machine learning, which is performed by using sensor information, which is related to a state of an inside or an outside of a supplying vehicle that supplies parameters to be used for the machine learning as an input/output data set, which is data including input parameters and an output parameter of the learned model; and
a server communication unit configured to transmit at least one of the generated learned model and an output parameter, which is calculated by input of sensor information of the vehicle as an input parameter to the learned model in a case where the sensor information of the vehicle is received, and
the vehicle control device comprises:
a data acquisition unit configured to acquire sensor information, which is related to a state of an inside or an outside of the vehicle; and
a communication unit configured to transmit a model request signal requesting transmission of the learned model or a parameter request signal requesting transmission of an output parameter calculated on a basis of the sensor information acquired by the data acquisition unit and the sensor information to the server and receive the generated learned model or the calculated output parameter in response to the model request signal or the parameter request signal, respectively.

14. A vehicle comprising a vehicle control device communicating with a server which stores a learned model obtained by machine learning,
wherein the server comprises:
a server learning unit configured to generates a learned model by performing the machine learning using an input/output data set, which is sensor information related to a state of an inside or an outside of a vehicle and is data including input parameters and an output parameter of the learned model, and
the vehicle control device comprises:
a data acquisition unit configured to acquire sensor information, which is related to a state of an inside or an outside of the vehicle; and
a transmission unit configured to transmit the sensor information acquired by the data acquisition unit to the server.

15. A vehicle comprising a vehicle control device communicating with a server which stores a learned model obtained by machine learning,
wherein the vehicle control device comprises:
a data acquisition unit configured to acquire sensor information, which is related to a state of an inside or an outside of the vehicle;
a learning unit configured to generate a learned model by performing the machine learning using an input/output data set, which is the sensor information acquired by the data acquisition unit and is data including input parameters and an output parameter of the learned model; and
a transmission unit configured to transmit the learned model generated by the learning unit to the server.

16. A control support method executed by a control support device which supports control of a vehicle using a learned model obtained by machine learning, the control support method comprising:
a data acquisition step of acquiring sensor information, which is related to a state of an inside or an outside of a supplying vehicle that supplies parameters to be used for the machine learning;
a learning step of reading an input/output data set, which is the sensor information acquired in the data acquisition step and is data including an input parameter and an output parameter of the learned model, from a storage unit and generating a learned model by performing the machine learning using the read input/output data set; and
a transmission step of transmitting at least one of the generated learned model and an output parameter obtained by inputting sensor information of the vehicle, control of which is supported, to the learned model as an input parameter.

17. A non-transitory computer readable recording medium storing a control support program for causing a control support device, which supports control of a vehicle using a learned model obtained by machine learning, to execute:
a data acquisition step of acquiring sensor information, which is related to a state of an inside or an outside of a supplying vehicle that supplies parameters to be used for the machine learning;
a learning step of reading an input/output data set, which is the sensor information acquired in the data acquisition step and is data including an input parameter and an output parameter of the learned model, from a storage unit and generating a learned model by performing the machine learning using the read input/output data set; and
a transmission step of transmitting at least one of the generated learned model and an output parameter obtained by inputting sensor information of the vehicle, control of which is supported, to the learned model as an input parameter.

18. A learned model comprising a neural network,
wherein the neural network comprises:
an input layer configured to receive input of input parameters that quantify a state of an inside or an outside of a vehicle;
an intermediate layer configured to receive input of signals output from the input layer, the intermediate layer having a multilayer structure; and
an output layer configured to receive input of signals output from the intermediate layer and output an output parameter that quantifies a predetermined state of the vehicle,
each of the layers includes one or more nodes,
the learned model is associated with travel history information of the vehicle, and
the learned model causes a computer to input the input parameters to the input layer, perform calculation based on a network parameter of the neural network which is a learned network parameter, and output a value that quantifies the predetermined state of the vehicle from the output layer.

19. A method of generating a learned model, which causes a computer to output a value that quantifies a predetermined state of a vehicle,
wherein the computer uses a neural network, which includes an input layer, which receives input of input parameters that quantify a state of an inside or an outside of the vehicle, an intermediate layer, which receives input of signals output from the input layer, the intermediate layer having a multilayer structure, and an output layer, which receives input of signals output from the intermediate layer, and outputs an output parameter, each of the layers including one or more nodes, to perform leaning while updating a network parameter of the neural network on a basis of an output parameter output by the output layer on a basis of input of the input parameters and an output parameter, which forms an input/output data set together with the input parameter, and storing the network parameter in a storage unit in association with travel history information of the vehicle.

* * * * *